US011836120B2

(12) United States Patent
Retinraj et al.

(10) Patent No.: US 11,836,120 B2
(45) Date of Patent: Dec. 5, 2023

(54) MACHINE LEARNING TECHNIQUES FOR SCHEMA MAPPING

(71) Applicant: Oracle International Corporation, Redwood Shores, CA (US)

(72) Inventors: Paul Deepakraj Retinraj, Fremont, CA (US); Sravan Kumar Ananthula, Frisco, TX (US); Rajan Madhavan, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 148 days.

(21) Appl. No.: 17/383,909

(22) Filed: Jul. 23, 2021

(65) Prior Publication Data

US 2023/0023645 A1    Jan. 26, 2023

(51) Int. Cl.
*G06F 16/21* (2019.01)
*G06N 3/08* (2023.01)
*G06N 3/04* (2023.01)

(52) U.S. Cl.
CPC ............ *G06F 16/211* (2019.01); *G06N 3/04* (2013.01); *G06N 3/08* (2013.01)

(58) Field of Classification Search
CPC .................. G06F 16/211; G06F 18/211; G06F 18/24323; G06F 40/295; G06F 16/86; G06F 16/258; G06F 16/215; G06F 16/9024; G06F 16/288; G06N 3/04; G06N 3/08; G06N 5/022; G06N 20/00; G06N 3/02
USPC ........................................................ 707/803
See application file for complete search history.

(56) References Cited

U.S. PATENT DOCUMENTS

| | | | |
|---|---|---|---|
| 2003/0120651 A1* | 6/2003 | Bernstein | G06F 16/86 |
| 2006/0271556 A1* | 11/2006 | Mukherjee | G16H 70/00 |
| 2008/0021912 A1* | 1/2008 | Seligman | G06F 16/36 |
| 2013/0091184 A1 | 4/2013 | Alexe et al. | |
| 2019/0318272 A1* | 10/2019 | Sassin | G06F 16/254 |
| 2020/0133978 A1* | 4/2020 | Ramamurti | G06F 8/38 |
| 2020/0304583 A1 | 9/2020 | Ruiz-Meraz et al. | |

(Continued)

FOREIGN PATENT DOCUMENTS

| | | |
|---|---|---|
| CN | 106776711 B | 4/2020 |
| WO | 2019/182977 A1 | 9/2019 |

(Continued)

OTHER PUBLICATIONS

Amshakala, K., et al., "Schema Matching Using Directed Graph Matching," WSEAS Transactions on Computers, vol. 12, Issue 1, Sep. 2013, pp. 341-354.

(Continued)

*Primary Examiner* — Evan Aspinwall
(74) *Attorney, Agent, or Firm* — Invoke

(57) ABSTRACT

Techniques are disclosed for generating a database schema using trained machine learning models that, in some embodiments, may include graph neural networks (GNN). A GNN may identify source to target database schema mappings using, among other features of the graph, context data associated with each node in a graph. Context data describes relationships between a particular node and some (or all) of the other nodes in the graph. The system may use this context data (and other graph data) in combination with a trained GNN model to identify a mapping between one or more source database entities to corresponding target database entities.

18 Claims, 5 Drawing Sheets

(56) References Cited

U.S. PATENT DOCUMENTS

2020/0401385 A1   12/2020  Seetharaman et al.
2021/0081819 A1    3/2021  Polleri et al.
2021/0081837 A1*  3/2021  Polleri .................. G06N 5/022

FOREIGN PATENT DOCUMENTS

WO     2019/204106 A1   10/2019
WO     2020/182413 A1    9/2020

OTHER PUBLICATIONS

Bogin, B., et al., "Representing Schema Structure with Graph Neural Networks for Text-to-SQL Parsing," In Proceedings of the 57th Conference of the Association for Computational Linguistics, ACL 2019, Jul. 28, 2019-Aug. 2, 2019, vol. 1, Long Papers, pp. 4560-4565.

* cited by examiner

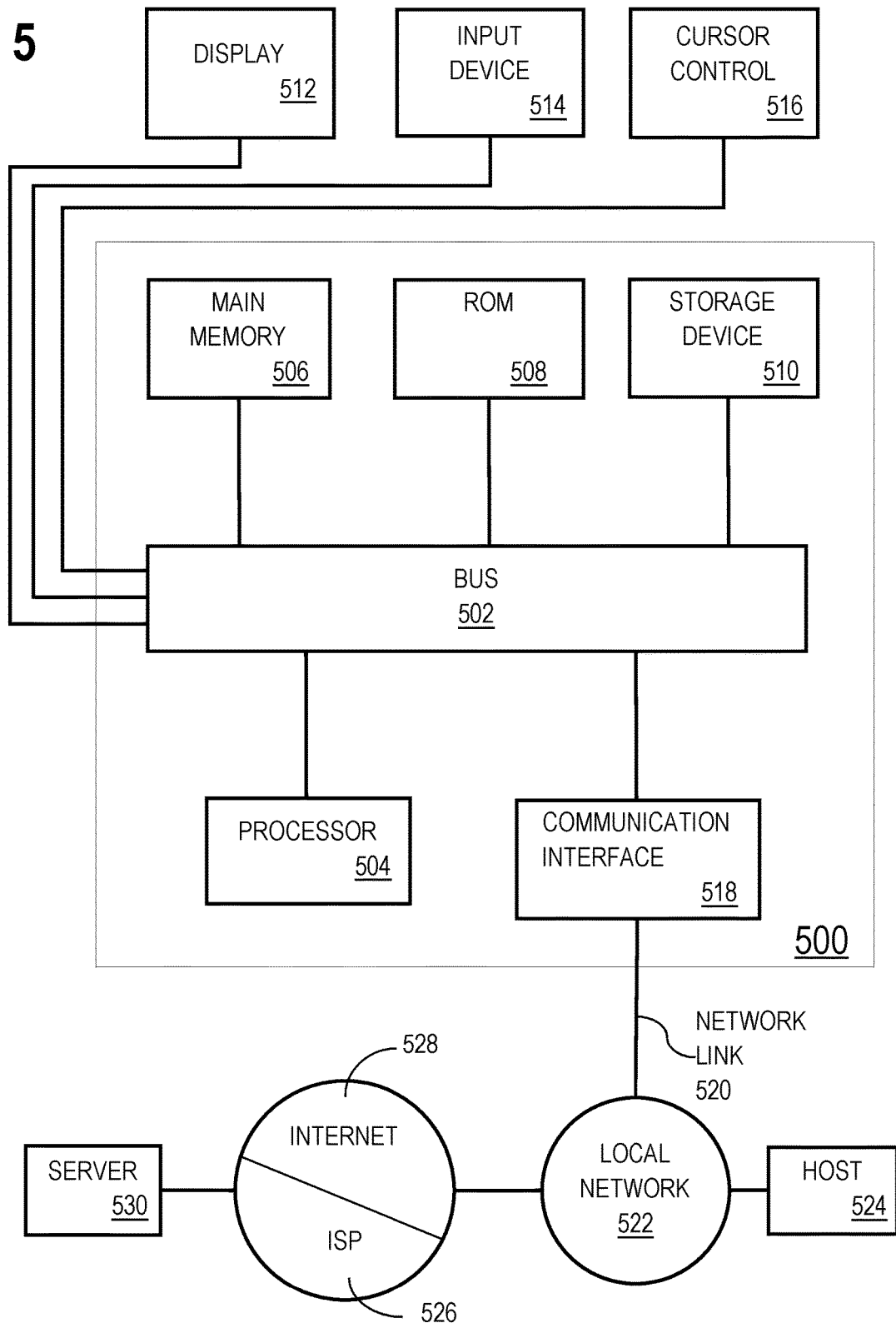

MACHINE LEARNING TECHNIQUES FOR SCHEMA MAPPING

TECHNICAL FIELD

The present disclosure relates to mapping a schema of one database to a schema of a different database. In particular, the present disclosure relates to machine learning techniques for schema mapping.

BACKGROUND

Mapping one schema to another is a common activity when working with different databases. At a high level, schema mapping provides a correlation between data elements of one database to corresponding database elements of another database. For example, corresponding tables in two (or more) different databases may be identified as analogs of one another. Similarly, one or more fields in a table of one database may be identified as corresponding to fields in a table of a different database. Schema mapping may be used to integrate databases that are to be merged or to facilitate inter-operability of data structures from different databases that are based on different data objects and/or different data object names.

In many situations, schema mapping requires precisely matching the schema attributes (e.g., field names, table names, data formats) of a "source" database (i.e., the database being converted to a new schema) to analogous schema attributes of a "target" database (i.e., the database to which the source is being converted). The mapping process, even when automated, usually requires manual intervention and/or supervision. Not only is the mapping process, even when partially or wholly automated, laborious, it also requires a high degree of precision and accuracy. In many cases, the mapping process involves an in-depth understanding of the commercial and technical context of the databases, the data stored therein, and the processes by which the data are generated. As a result, the process is time consuming and prone to error.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 5 shows a block diagram that illustrates a computer system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. GENERATING A SCHEMA MAPPING
4. SELECTING NODES
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

One or more embodiments generate a map from a source database schema to a target database schema based on graphical context data for source nodes in a graph of a source database schema and target nodes in a graph of a target database schema. Graphical context data for a source node and a target node represents relationships of a given node to some (or all) of the other nodes in the respective source or target graph. The system compares context data from nodes in the source graph to nodes in the target graph to identify nodes that correspond to one another in the different graphs. The system uses identified correspondences to generate a map that maps elements of the source database schema to a target database schema. This map may be applied to convert data items from one schema to another.

One or more embodiments described in this Specification and/or recited in the claims may not be included in this General Overview section.

2. Architectural Overview

As indicated above, generating a mapping that converts a database schema associated with a source database into a database schema associated with a target database is time consuming, error prone, and laborious. Examples of the present disclosure overcome these challenges associated with generating a database schema using trained machine learning models that, in some embodiments, may include graph neural networks (GNN). In some examples, using a trained graph neural network to graphically render source and target database schemas as n-dimensional graphs improves the convenience, speed, and accuracy of the schema mapping process. In particular, the GNN may identify source to target database schema mappings using, among other features of the graph, context data associated with each node in a graph. Context data describes relationships between a particular node and some (or all) of the other nodes in the graph. The system may use this context data (and other graph data) in combination with a trained GNN model to generate a mapping between one or more source database entities to corresponding target database entities.

Figure 1:
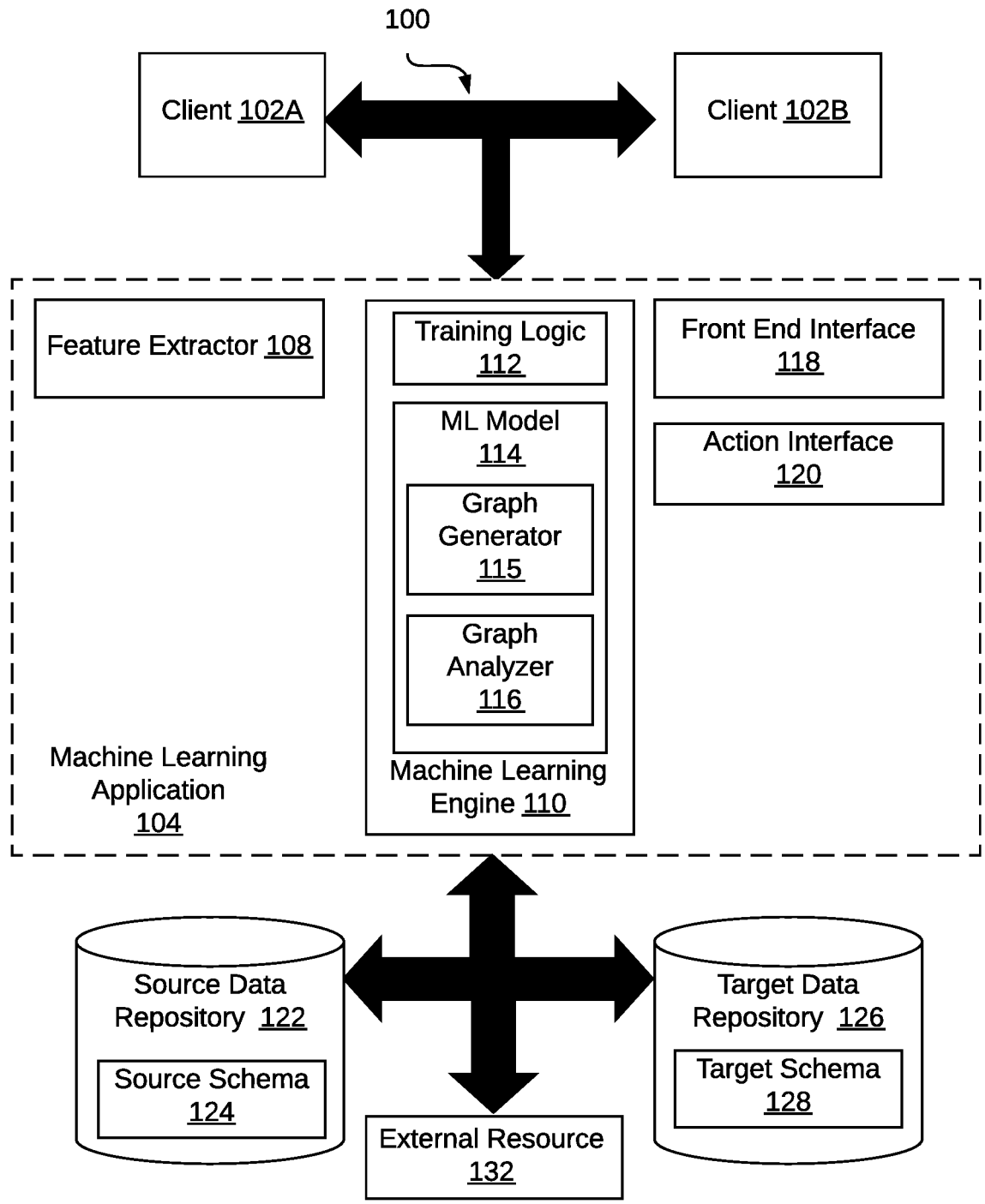
FIG. 1 illustrates a system in accordance with one or more embodiments.

FIG. 1 illustrates a system 100 in accordance with one or more embodiments. As illustrated in FIG. 1, system 100 includes clients 102A, 102B, a machine learning application 104, a source data repository 122, a target data repository 126, and external resource 132. In one or more embodiments, the system 100 may include more or fewer components than the components illustrated in FIG. 1.

The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The clients 102A, 102B may be a web browser, a mobile application, or other software application communicatively coupled to a network (e.g., via a computing device). The clients 102A, 102B may interact with other elements of the system 100 directly or via cloud services using one or more communication protocols, such as HTTP and/or other communication protocols of the Internet Protocol (IP) suite.

In some examples, one or more of the clients 102A, 102B are configured to receive and/or generate data items that are stored in one or both of the data repositories 122, 126. The clients 102A, 102B may transmit the data items to the ML application 104 for analysis. The ML application 104 may analyze the transmitted data items by applying one or more trained ML models to the transmitted data items, thereby extracting a hierarchy from the data items.

The clients 102A, 102B may also include a user device configured to render a graphic user interface (GUI) generated by the ML application 104. The GUI may present an interface by which a user triggers execution of computing transactions, thereby generating and/or analyzing data items. In some examples, the GUI may include features that enable a user to view training data, classify training data, instruct the ML application 104 to map a source database schema to a target database schema, generate graphs corresponding to database schemas, and other features of embodiments described herein. Furthermore, the clients 102A, 102B may be configured to enable a user to provide user feedback via a GUI regarding the accuracy of the ML application 104 analysis. That is, a user may label, using a GUI, an analysis generated by the ML application 104 as accurate or not accurate, thereby further revising or validating training data. This latter feature enables a user to label data analyzed by the ML application 104 so that the ML application 104 may update its training.

The ML application 104 of the system 100 may be configured to train one or more ML models using training data, prepare target data before ML analysis, and analyze data so as to map a source database schema to a target database schema, thereby enabling the integration or interoperation of database schemas.

The machine learning application 104 includes a feature extractor 108, a machine learning engine 110, a frontend interface 118, and an action interface 120.

The feature extractor 108 may be configured to identify characteristics associated with data items. The feature extractor 108 may generate corresponding feature vectors that represent the identified characteristics. For example, the feature extractor 108 may identify attributes within training data and/or "target" data that a trained ML model is directed to analyze. Once identified, the feature extractor 108 may extract characteristics from one or both of training data and target data.

The feature extractor 108 may tokenize some data item characteristics into tokens. The feature extractor 108 may then generate feature vectors that include a sequence of values, with each value representing a different characteristic token. In some examples, the feature extractor 108 may use a document-to-vector (colloquially described as "doc-to-vec") model to tokenize characteristics (e.g., as extracted from human readable text) and generate feature vectors corresponding to one or both of training data and target data. The example of the doc-to-vec model is provided for illustration purposes only. Other types of models may be used for tokenizing characteristics.

In other examples, the feature extractor 108 may identify attributes associated with data entities and a database schema, tokenize the attributes, and generate one or more feature vectors that correspond to entities of the schema and/or the schema itself. For example, the feature extractor 108 may identify data entities associated with a database schema that include tables, arrays, files, sets, fields, and/or other types of data objects. The feature extractor 108 may then identify, within these various data objects, attribute names, attribute definitions, attribute descriptions, permitted field values and/or permitted field value types (e.g., integer, string, alphanumeric characters). The feature extractor 108 may then process the identified entities, entity types, and/or attributes to generate one or more feature vectors.

The feature extractor 108 may append other features to the generated feature vectors. In one example, a feature vector may be represented as $[f_1, f_2, f_3, f_4]$, where $f_1, f_2, f_3$ correspond to characteristic tokens and where $f_4$ is a non-characteristic feature. Example non-characteristic features may include, but are not limited to, a label quantifying a weight (or weights) to assign to one or more characteristics of a set of characteristics described by a feature vector. In some examples, a label may indicate one or more classifications associated with corresponding characteristics.

As described above, the system may use labeled data for training, re-training, and applying its analysis to new (target) data. The feature extractor 108 may optionally be applied to new data (yet to be analyzed) to generate feature vectors from the new data. These new data feature vectors may facilitate analysis of the new data by one or more ML models, as described below. In the examples described below, the "new" data may be that of a source database schema that is to be mapped to analogous entities in a target database schema.

The machine learning engine 110 of the ML application 104 includes training logic 112 and a trained machine learning (ML) model 114. The trained ML model 114 further includes a graph generator 115 and a graph analyzer 116.

In some examples, the training logic 112 receives a set of data items as input (i.e., a training corpus or training data set). Examples of data items include, but are not limited to, data entities (e.g., structures and/or objects, such as fields, arrays, tables) associated with a "target" database schema that, as described below, a "source" database schema is mapped to. The data items used for training may also be associated with one or more attributes, such as those described above in the context of the feature extractor 108 (e.g., field names, field values, field value types).

As described below, one example of an ML model used in some embodiments of the system 100 is that of a graph neural network (GNN). In this example, the training logic 112 may progressively train the GNN using different data sets. For example, the GNN may be trained using supervised training data using one or more labeled graph-representations of training schemas. In some embodiments, these supervising training processes may be executed using generic schema training data. In other examples, the training logic 112 may use a "target" database schema (i.e., the schema into which a source database schema is to be translated and/or converted) to train the GNN algorithm.

In one example, the system may train a GNN to recognize common language terms, whether directly or in communication with a natural language processing machine learning (NLP) model. Once trained to recognize natural language, the GNN may then use NLP processing to interpret natural language aspects of data entity attributes.

The system may train an NLP model (or NLP functions within a GNN) using, for example a publicly available natural language processing (NLP) dataset. Examples of publicly available NLP datasets include, but are not limited to, those available from commoncrawl (commoncrawl.org) and Wikipedia®.

The system may access industry-specific NLP training datasets. Examples include, but are not limited to those available from Luminati, University of California Irvine, and Kaggle. The system may also access pre-trained NLP models that include, but are not limited to, Google® BERT, Microsoft® CodeBERT®, among others. The system may also be configured to execute its training from a domain centric architecture hub.

In some examples, training data used by the training logic 112 to train the machine learning engine 110 includes feature vectors of data items that are generated by the feature extractor 108, described above. In various examples, the training logic 112 may access one or more training datasets (e.g., publicly and/or privately available datasets) that may be wholly or partially rendered as a graph. A training graph (or graphs) (i.e., one or more graphical representations of the training data and/or multiple training datasets) may then be used to train a graphical neural network (GNN). In some examples, training a GNN may occur in stages, first using a generic dataset, whether a publicly available NLP training dataset (e.g., an NLP training dataset, such as those available from commoncrawl or Wikipedia®) or a generically pre-trained model (e.g., OpenAI GPT-3, Google® BERT, Microsoft® CodeBERT, Facebook® RoBERTa). Training may continue by subsequently using additional datasets that are focused in a particular field or subject to which a trained GNN will be applied. Examples, include Luminati for health care subject matter and Kaggle for acronyms, abbreviations, and other similar concise expressions. Training may further be refined by applying one or more filters to the training data to restrict some aspects of the training data. For example, geographic filters (e.g., ZIP code, city, state, province) may be used to exclude regional colloquialisms in an NLP database.

The training logic 112 may be in communication with a user system, such as clients 102A, 102B. The clients 102A, 102B may include an interface used by a user to apply labels to the electronically stored training data set.

The machine learning (ML) engine 110 may be trained using data entities associated with a target database schema. Once trained, the trained ML engine 110 may be applied to a source database schema to identify data entities within the source database schema that are analogous to target database entities. Once the analogs are identified, the ML engine 110 may generate a mapping so that the source database schema may be translated into the target database schema. The mapping may be stored as a data object or as executable code. Techniques describing these operations are described below in the context of FIGS. 2 and 3.

In some examples the ML model 114 may be a graph neural network (GNN), sometimes also referred to as a graph deep learning model. At a high level, a graph neural network is configured like other types of neural networks in which various "hidden" layers of multiple neurons successively analyze data provided via an input layer to generate a prediction via an output layer. Unlike other types of neural networks, such as convolutional neural networks, GNNs are adapted for the analysis of graphical data in part because they can analyze graphical data collectively and in its entirety, as opposed to segmented or piece-wise analysis often executed by a convolutional neural network.

Examples of GNN algorithms that may be used as the ML model 114 include, but are not limited to, a graph convolution network (GCN), gated graph convolution network (G-GCN), and graph isomorphism network (GIN). These specific graph algorithms are adapted for the analysis of graphical data, which lend themselves to the analysis of database schemas that may be conveniently rendered as graphs of nodes (representing database entities) and edges (representing relationships between entities).

The ML model 114 is schematically represented in FIG. 1 as including a graph generator 115 and a graph analyzer 116 for convenience of explanation. As described below in more detail in the context of FIGS. 2 and 3, the graph generator 115 may receive a database schema and convert the schema into a graph representation. In preparation for representing the schema as a graph of nodes and edges, the ML model 114 may analyze database schema data and identify various attributes associated with the analyzed schema and/or the entities of the schema. These attributes may then be used to identify schema entities and entity relationships that are then used to render the schema as a graph. Example attributes, also indicated above, include but are not limited to attribute names, attribute definitions, attribute descriptions, entity names, entity descriptions, entity groups, industry type (e.g., financial, healthcare, manufacturing, service), as well as other contextual data. Once the ML model 114 has analyzed these data, the graph generator 115 may use the analysis to represent the analyzed schema as a graph.

In some examples, the graph generator 115 may also generate context data for each node and/or edge in a graph representation of a schema. Context data for a particular node (e.g., each individual node in a graph) may include, for example, identification of the neighboring nodes in the graph of the particular node and identification of next nearest neighbors. In some examples, context data associated with each node may even include (a) an identification of every other node in the graph and (b) a corresponding relationship to every other node in the graph. Example descriptions of the relationship between a particular node and any other node in the graph include an identification of intervening nodes, a number of intervening nodes, common fields with the intervening nodes, and the like.

The graph analyzer 116 may execute operations that, for example, compare a source database schema graph to a target database schema graph. These operations are described in detail below in the context of FIGS. 2 and 3. At a high level, the graph analyzer 116 may execute operations that identify nodes in a target database schema that are analogous to corresponding nodes in a source database schema. The graph analyzer 116 may identify these analogous nodes (and the entities represented by the nodes) using context data to identify analogous source and target nodes (and therefore analogous source and target entities). The graph analyzer 116 may accomplish this by, for example, identifying similar patterns of relationships to other nodes and/or by comparison of similar context data between nodes in the source and target graphs. In some examples, the graph analyzer 116 may execute a similarity analysis on nodes and node context data. In other examples, the graph analyzer 116 may execute an analysis that compares specific field and/or attribute values, such as via NLP analysis. The system may use any combination of these techniques to identify nodes in the source and target graphs as analogs.

In other examples, the operations and features described above in the context of the GNN trained machine learning model may be implemented using one or more other types of ML models. In some examples, ML model 114 may include one or both of supervised machine learning algorithms and unsupervised machine learning algorithms. In some examples, any one or more of the GNN models described above may be a component of the ML model 114. In other examples, any one or more of linear regression, logistic regression, linear discriminant analysis, classification and regression trees, naïve Bayes, k-nearest neighbors, learning vector quantization, support vector machine, bagging and random forest, boosting, back propagation, and/or clustering models may be adapted to perform the techniques described herein. Some embodiments described below include gated graph neural networks, graph attention networks, and graph convolution networks. In some examples, multiple trained ML models of the same or different types may be arranged in a ML "pipeline" so that the output of a prior model is processed by the operations of a subsequent model. In various examples, these different types of machine learning algorithms may be arranged serially (e.g., one model further processing an output of a preceding model), in parallel (e.g., two or more different models further processing an output of a preceding model), or both.

Other configurations of trained ML model 114 may include additional elements or fewer elements.

The frontend interface 118 manages interactions between the clients 102A, 102B and the ML application 104. In one or more embodiments, frontend interface 118 refers to hardware and/or software configured to facilitate communications between a user and the clients 102A, 102B and/or the machine learning application 104. In some embodiments, frontend interface 118 is a presentation tier in a multitier application. Frontend interface 118 may process requests received from clients and translate results from other application tiers into a format that may be understood or processed by the clients.

For example, one or both of the client 102A, 102B may submit requests to the ML application 104 via the frontend interface 118 to perform various functions, such as for labeling training data and/or analyzing target data. In some examples, one or both of the clients 102A, 102B may submit requests to the ML application 104 via the frontend interface 118 to view a graphic user interface related to analysis of a schema. In still further examples, the frontend interface 118 may receive user input that re-orders individual interface elements.

Frontend interface 118 refers to hardware and/or software that may be configured to render user interface elements and receive input via user interface elements. For example, frontend interface 118 may generate webpages and/or other graphical user interface (GUI) objects. Client applications, such as web browsers, may access and render interactive displays in accordance with protocols of the internet protocol (IP) suite. Additionally or alternatively, frontend interface 118 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In an embodiment, different components of the frontend interface 118 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the frontend interface 118 is specified in one or more other languages, such as NodeJS, Hypertext Preprocessor (PHP), Java, C, or C++.

The action interface 120 may include an API, CLI, or other interfaces for invoking functions to execute actions. One or more of these functions may be provided through cloud services or other applications, which may be external to the machine learning application 104. For example, one or more components of machine learning application 104 may invoke an API to access information stored in a data repository (e.g., data repository 126) for use as a training corpus for the machine learning engine 104. It will be appreciated that the actions that are performed may vary from implementation to implementation.

In some embodiments, the machine learning application 104 may access external resources 132, such as cloud services. Example cloud services may include, but are not limited to, social media platforms, email services, short messaging services, enterprise management systems, and other cloud applications. Action interface 120 may serve as an API endpoint for invoking a cloud service. For example, action interface 120 may generate outbound requests that conform to protocols ingestible by external resources.

Additional embodiments and/or examples relating to computer networks are described below in Section 6, titled "Computer Networks and Cloud Networks."

Action interface 120 may process and translate inbound requests to allow for further processing by other components of the machine learning application 104. The action interface 120 may store, negotiate, and/or otherwise manage authentication information for accessing external resources. Example authentication information may include, but is not limited to, digital certificates, cryptographic keys, usernames, and passwords. Action interface 120 may include authentication information in the requests to invoke functions provided through external resources.

In one or more embodiments, data repositories 122, 126 may be any type of storage unit and/or device (e.g., a file system, database, collection of tables, or any other storage mechanism) for storing data. Further, data repositories 122, 126 may each include multiple different storage units and/or devices. The multiple different storage units and/or devices may or may not be of the same type or located at the same physical site. Further, data repositories 122, 126 may be implemented or may execute on the same computing system as the ML application 104. Alternatively or additionally, data repositories 122, 126 may be implemented or executed on a computing system separate from the ML application 104.

Data repositories 122, 126 may be communicatively coupled to the ML application 104 via a direct connection or via a network.

In the embodiment illustrated in FIG. 1, the data repositories 122, 126 includes a source schema 124 and a target schema 128, respectively. In some embodiments, the data repositories 122, 126 also store data items associated with each of the source database and the target database, respectively.

Information related to target data items and the training data may be implemented across any of components within the system 100. However, this information may be stored in the data repositories 122, 126 for purposes of clarity and explanation.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Generating a Schema Mapping

Figure 2:
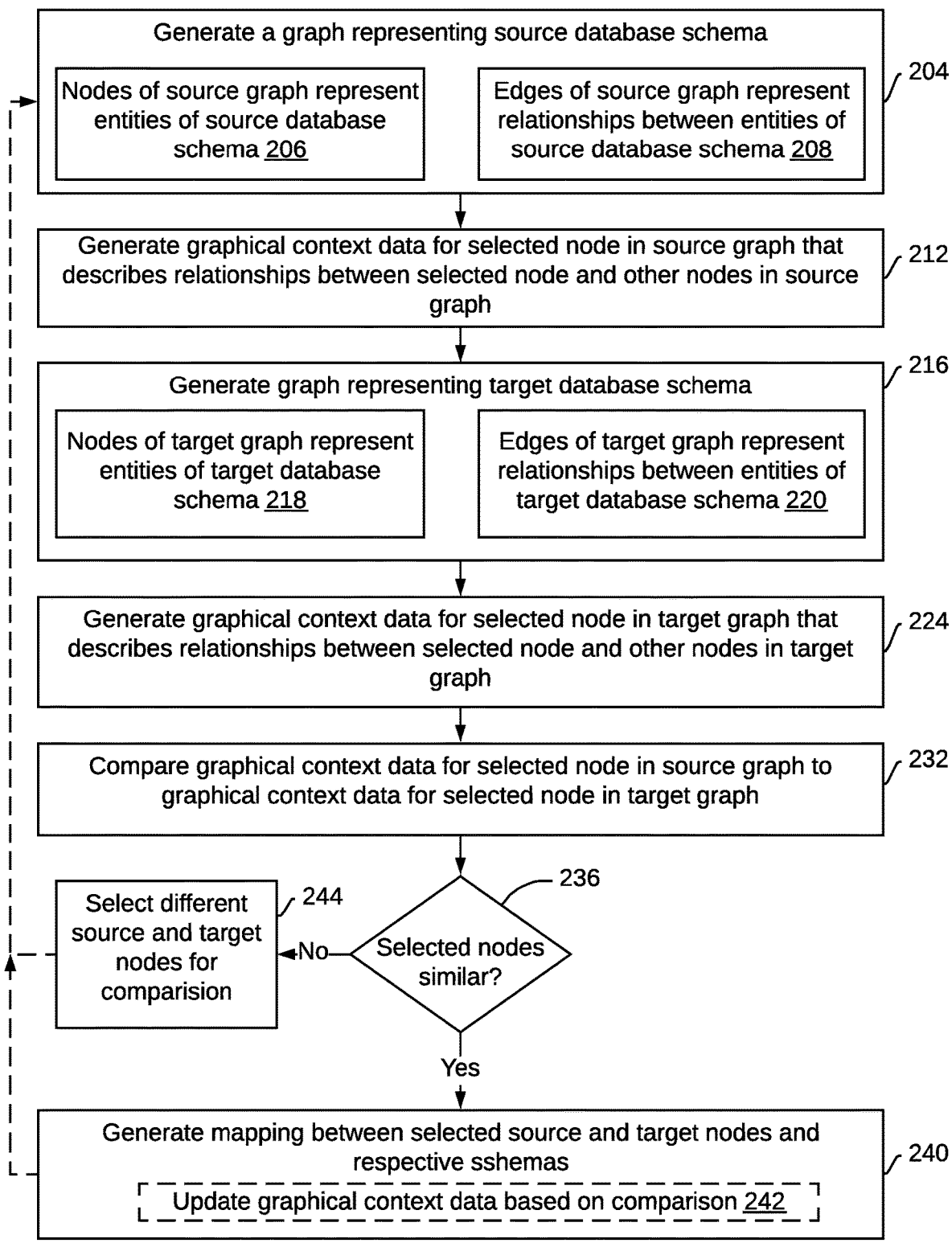
FIG. 2 illustrates an example set of operations for generating a mapping between a source database schema and a target database schema in accordance with one or more embodiments.
Figure 3:
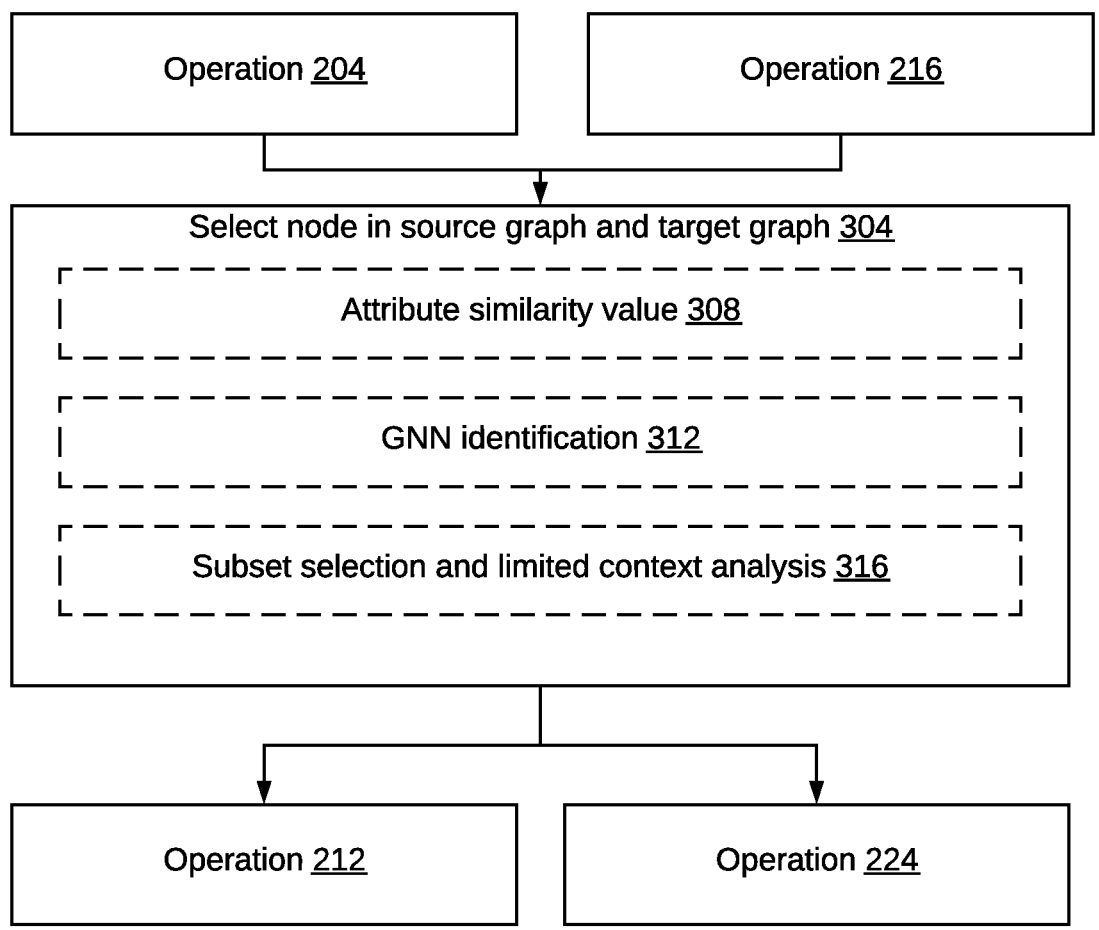
FIG. 3 illustrates an example set of operations for selecting data entities to compare in preparation for generating a mapping between a source database schema and a target database schema in accordance with one or more embodiments.

FIG. 2 illustrates an example set of operations, collectively referred to as a method 200, for generating a mapping of a source database schema to a target database schema in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

The method 200 may begin by generating a graph representing a source database schema (operation 204). The source database schema, on which the generated graph is based, may include a set of data entities (or "entities" for brevity). As described above, these entities may include tables, arrays, fields, and any of a number of other data objects.

The system may generate a graph representing the source database schema using any of a number of techniques. In some examples, a GNN (or other trained machine learning algorithm) may execute the operation 204 by identifying entities of the source database schema using entity identifiers. For example, the GNN may identify unique entities in the source database schema by recognizing a particular key or set of keys (e.g., primary keys) in one or more data entities that uniquely identify the data entities. In other examples, the GNN (or other trained ML model) may be trained to recognize patterns in the data stored in association with the data entities. In some examples, the GNN (or other trained ML model) may recognize other entity attributes and/or attribute values that are associated with entities and corresponding entity identities. The GNN may use these identified patterns, regardless of source, to uniquely identify the data entities.

The GNN may identify one or more relationships between uniquely identified data entities. For example, the GNN may identify foreign keys, super keys, or other similar identifiers within the uniquely identified data entities. The GNN may then use these other types of data to identify entities related to a particular one or more of the uniquely identified entities. For example, once the GNN identifies foreign keys, or other types of keys, within the data entities, the GNN may use these keys to identify relationships between the various data entities. In other examples, the GNN (or other trained ML model) may even identify patterns or values within data stored within the data entities as a way of identifying relationships between data entities. In still other examples, the GNN may use other attributes and/or combinations of attributes to uniquely identify data entities and the relationships to other data entities. The system may use any one or more of these techniques to generate the graph representing the source database schema.

Nodes of the graph representing the source database schema ("source graph") may correspond to entities in the source database schema (operation 206). Edges that connect nodes in the source graph may represent the relationships between the entities connected by the edge (operation 208). A simple illustration of an edge between two nodes is that of a direct connection. In terms of the directly connected data entities themselves, these entities may for example have a direct relationship of a set and subset (e.g., parent-child). Another illustration of a direct relationship is that of peer tables that are employed by another data entity (e.g., a sibling direct relationship). Other types of data entities and other types of direct relationships will also be appreciated in light of this description.

While understanding edges is conveniently illustrated by these direct relationships, the source graph generated in the operation 204 includes many other types of relationships that are not necessarily direct. In some examples, the system may generate and store these other relationships as graphical context data (operation 212). The system may use this graphical context data to generate an accurate mapping of source database schema to target database schema, in various examples.

In some examples, graphical context data may be generated for (and stored in association with) each node in the generated graph. The graphical context data may include data representations of connections and relationships from each node to other nodes in the graph. In some examples, the graphical context data for each node may include data representations of every other node in the graph. In this example, detailed graphical context data describes a location in n-dimensional space of each particular node relative to all of the other nodes in the graph. That is, both the neighboring (and other) nodes and their relationships relative to each particular node are identified in the graphical context data. In some examples, the graphical context data describes a number of intervening nodes and/or edges between a particular node and every other node in the graph, thereby identifying immediate neighbors, next nearest neighbors, $3^{rd}$ level neighbors, and even successively larger dimensions of neighbors. The graphical context data may identify the graphical pathway between a particular node and every other node, such as by the identities of the intervening nodes and edges.

A trained GNN may use graphical context data (e.g., in latter stages of the method 200 described below) to further improve the accuracy of the graph and of the mapping from the source graph to the target graph.

The operations described above for processing the source database schema may be applied to a target database schema to which the source database schema is to be mapped.

Specifically, the system may generate a graph representing a target database schema (operation 216) in which nodes of the target graph represent entities of the target database schema (operation 218) and edges of the target graph represent relationships between entities of the target database schema (operation 220).

The system may generate the nodes, edges, and the graph as a whole for the target database schema using the techniques described above in the context of the operations 204, 206, 208. Specifically, the system may identify data entities using primary keys associated with the data entities and that uniquely identify the data entities. The system (whether a GNN or other trained ML model) may use foreign keys, other types of keys, patterns in data, and/or patterns in attributes and attribute values to uniquely identify data entities and to identify the relationships between data entities.

Once the system identifies the data entities and edges using these techniques, the system may then use these data to generate a graph of the target database schema. In some examples, a trained GNN (e.g., trained using the techniques described above and additionally trained using data associated with the target database schema itself) may generate the graph.

As also described above, the system may generate context data for each of the nodes in the target database schema graph relative to some or all of the other nodes in the target database schema graph (operation 224). These data place a particular node in context relative to every other node in the graph.

The system may then begin a process of mapping the source schema to the target schema using the corresponding graphs and graphical context data. In some examples, this process may include comparing graphical context data for a selected node in the source graph to graphical context data for a selected node in the target graph (operation 232). The selection and comparison processes are repeated for some or all of the nodes in the source and target graphs to generate a mapping, thereby effectively predicting links between the selected node and other nodes in the target graph.

The system may select a particular node in the source graph and a particular node in the target graph to compare. The selection techniques are described below in the context of FIG. 3 and the method 300.

Upon selecting nodes in the source graph and the target graph, the system may execute several aspects as part of comparing operation 232. By executing the comparing operation 232, the system may identify nodes in the source graph and the target graph that correspond to one another, thereby generating a mapping between the corresponding schemas. As part of the comparing operation 232, the system may also update, revise, or otherwise increase the accuracy of the graphical context data associated with each node in one or both of the source graph and/or the target graph.

In one example, the system (in some embodiments, employing a trained GNN) may initially compare attributes and/or attribute values between respective nodes of the source graph and the target graph that the system is comparing. These attributes and/or attribute values may be present in the graphical context data associated with the nodes and/or used to generate a representation of the node itself. Regardless, this direct comparison of attributes and/or attribute values may, in some examples, be a computationally efficient technique to identify nodes in the source graph and the target graph that correspond to one another. These data may be used to generate (in whole or in part) the mapping between the schemas.

In some examples, the system may compare, for example, key names associated with data items and execute a similarity comparison (e.g., a cosine similarity and/or similarity using one or more layers in a neural network) on the key names. For example, the system may detect that a primary key name for a data entity in the source graph has a similarity score above a threshold value (e.g., above 0.7, 0.75, 0.9, 0.95) relative to a primary key name for a data entity in the target graph. One illustration of this situation is that of a node in the source graph associated with a primary key name (e.g., in graphical context data) of "customer identifier" and a node in the target graph associated with a primary key name (e.g., in graphical context data) of "customer ID." Because the system will identify these key names as similar (e.g., having a similarity score above a threshold value), the system may associate the data entities in the source and target graphs labeled with these key names with each other. This association may then be used to generate (in part) the mapping between the schemas.

In some embodiments, the system may execute the similarity analysis on multiple attributes and/or attribute values, whether a subset of attributes and/or attribute values (e.g., primary key, foreign keys, value types) or the entirety of the attributes and/or attributes associated with the nodes being compared. In some examples, determining whether the compared nodes correspond to one another may be based on a similarity score that incorporates similarity between the number and/or set of attributes and/or attribute values compared.

In some embodiments, the comparing operation 232 uses the capabilities of a trained ML model (and more specifically, a GNN) beyond the application of a similarity analysis. In one example, a GNN may analyze the graphical context data for compared nodes of the source graph and of the target graph to determine whether the compared nodes are similarly situated within their respective graphs.

For example, having been trained using target schema training data, a GNN may analyze a particular node of a source graph to execute a prediction of its graphical context data. In one example, the GNN may predict the immediate neighbors (i.e., neighbors connected via one edge) of the particular node being analyzed in the source graph, the next-nearest neighbors (i.e., neighbors connected via two edges), and the like. As part of this process, the GNN may predict at least a portion of the graphical context data associated with each of the predicted neighbors. Similarly, the GNN may predict attributes and/or attributes values associated with edges connecting a particular node to its immediate neighbors (and the edges connecting the immediate neighbors to the next-nearest neighbors).

In some examples, this prediction process may additionally or alternatively be applied to the target schema. That is, a GNN may predict graphical context data that includes a predicted set of edges and a predicted set of nodes based on attributes associated with target data entities that are represented by the target graph nodes. The system may then compare the predicted target graph (or portions thereof) to the actual target graph. The system may add nodes, edges, and any corresponding graphical context data to the target graph to generate an updated target graph. The updated target graph (and its associated graphical context data) may then be used in the analysis of the source graph to generate a more accurate mapping between source and target databases.

In some examples, the GNN may execute a prediction for a portion of an analyzed source graph. For example, a GNN may execute a prediction for the neighboring nodes and edges that are directly connected to a particular node in the source graph. In other examples, a GNN may execute a prediction for the neighboring nodes and edges and the next-nearest neighboring nodes and edges. In still other examples, a GNN may execute a prediction for any degree of neighbors from a particular node in a source graph as long as a confidence interval for the prediction as a whole or of a particular node/edge is above a threshold confidence interval (e.g., above a 50%, 60%, 75%, 90% confidence level). In other words, the system determines a location of the selected node in the source graph relative to other nodes in the source graph based on the connections (edges) of the selected node to the other nodes and the attributes and/or attribute values of the other nodes. This identifies a position of the selected node within the source graph relative to its neighbors. This identified position may then be compared to similar relative position data of nodes in the target graph to determine whether compared source and target nodes are similar or not.

The system may compare the predicted (or actual) graphical context data associated with the particular node in the source graph to graphical context data for one or more selected nodes in a target graph. For example, as described above, the system may execute a similarity analysis between the predicted graphical context data of the selected node in the source graph to nodes in the target graph. Alternatively, one or more hidden layers of neurons in a GNN may determine whether the nodes are analogous.

If the relationships between the compared nodes of the predicted source graph portion and the target graph are similar, then the system may identify the analyzed source node as similar to an identified target node (operation 236).

For selected source graph nodes that are identified as similar to corresponding target graph nodes, the system may generate a mapping between these nodes, and more specifically, between the corresponding aspects of the source schema and target schema represented by the similar nodes (operation 240). In some examples, this mapping may associate data entities of the source schema to those of the target schema. In some examples, the mapping may (in addition or as an alternative), associate attributes and/or attribute values of a source database schema with those of a target database schema. The mapping enables, for example, entities of a source database to be interoperable with (e.g., accessed/read/written to) or imported into a target database.

In some examples, the mapping may generate a set of rules that, when applied, transforms, converts, or translates source database schema into a target database schema. In some examples, the mapping may be stored as a data entity or data object that identifies the correspondence between source data entities and target data entities. In some examples, the mapping may be stored as an executable file that translates or converts source data entities into target data entities.

In some examples, the execution of the operation 232 and determination that source and target nodes are similar also update context data based on the comparison (operation 242). For example, based on the comparison, the system may predict a link between entities in the source graph that are not directly present in the source graphical context data but is predicted by the GNN. The system may then update the graphical context data for the selected node to add the predicted link. This may improve the accuracy and/or completeness of the source graphical context data. Similarly, some edges may be removed from the source graphical context data based on the prediction. In other examples, any aspect of the graphical context data may be updated based on a prediction, whether the identity of the connected nodes, the edges/relationships between connected nodes, among others.

In some examples, a user may manually intervene in the process to alter mappings that are generated by the system (e.g., provided via a client device 102). The manual updates may be provided to the GNN or other trained machine learning model to update training data. Essentially the user may alter a label via a user interface so that a correct association between a source database schema data entity and a corresponding target database schema entity are stored in the system.

If a selected source node is not identified as similar to a target node, the system may select different nodes for comparison (operation 244). The process may restart by selecting nodes according to the method 300 after which the method 200 is executed.

4. Selecting Nodes

The system may execute a method 300 for selecting a node in a source graph to compare to a node in a target graph. The various example analyses described below may be executed as a way of efficiently identifying source graph and target graph nodes more likely to benefit from the detailed analysis of the method 200 that may result in a mapping between data entities of the source and target database schemas.

In one example, the system may identify one or more data entity attributes and/or attribute values by which to compare nodes based on a similarity analysis, such as a cosine similarity analysis (operation 308). In some embodiments, a user may provide the criteria by which to execute the similarity analysis (e.g., a primary key). The system may execute a similarity analysis on the attributes and/or attribute values and, based on the resulting similarity value, either select or not select the entities and their corresponding nodes for comparison. For example, if a comparison of source and target primary nodes has a similarity value that is above a threshold value, then the system may select the nodes for the more extensive comparison executed in the method 200.

In another example, a trained machine learning model, such as a GNN, may identify a source graph node to compare to a target graph node (operation 312). The trained machine learning model may determine whether nodes are analogous, such as via the collective analysis of various hidden layers of neurons, to determine if identified source graph and target graph nodes are comparable. In some examples, the GNN may analyze and compare graphical context data between a source graph node and a target graph node to determine whether they should be compared using the analysis of the method 200. This previously described comparison may be applied at a more cursory level (e.g., focused on nearest neighbors, number of edges) as a computationally efficient method by which source and target graph nodes are identified for further analysis.

In still another embodiment, the system may select a subset of nodes in a source graph to compare to a subset of nodes in a target graph (operation 316). The nodes of the source graph subset may be compared to the nodes of the target graph subset to determine whether one or more nodes in the source graph are similar to one or more corresponding nodes in the target graph. As described above, this analysis may be based on comparing graphical context data and identifying whether the graphical context data for any of the nodes has a similarity value above a threshold value.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4:
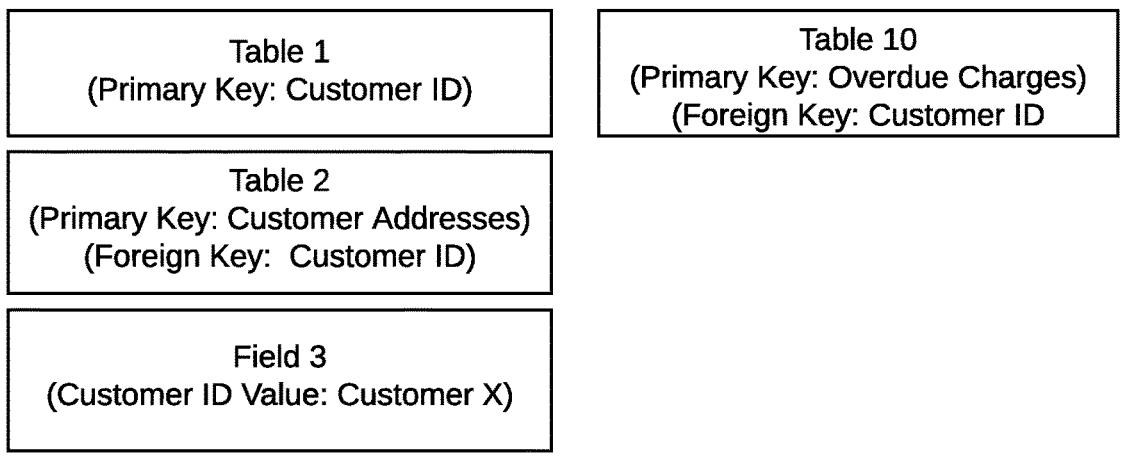
FIG. 4 illustrates a detailed example embodiment in which some of the processes described in FIGS. 2 and 3 are executed on a first database schema to generate a mapping to a second database schema.
Figure 4:
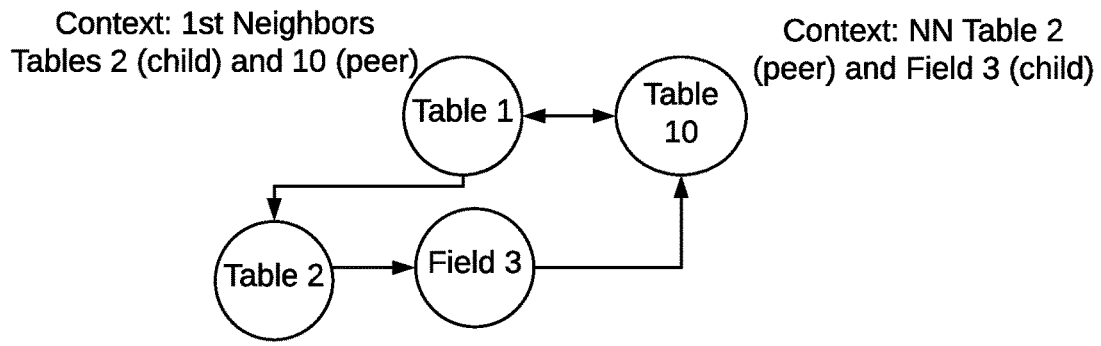
Figure 4:
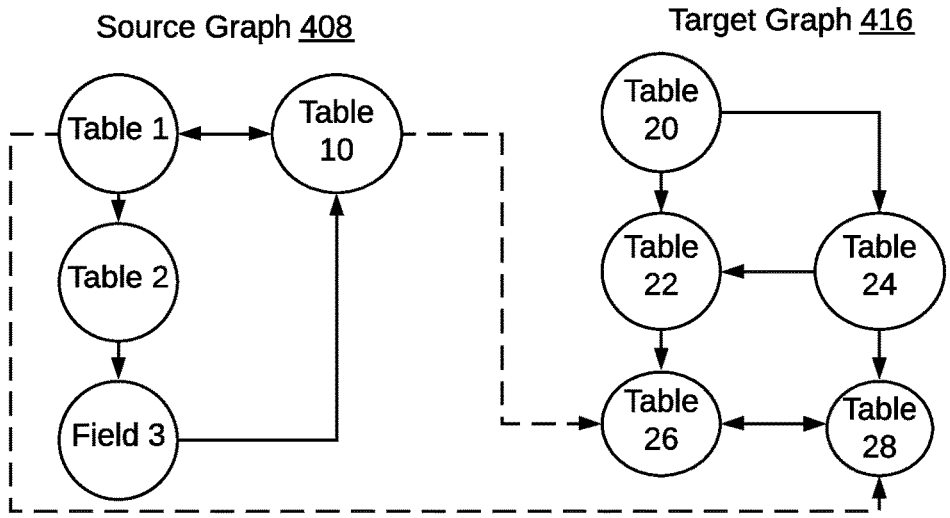

FIG. 4 schematically illustrates stages of generating a mapping between a source database schema and a target database schema. The source database entities 404 in this schematic illustration include Table 1, Table 2, and Table 10 and a Field 3. Table 1 is titled with, and has a primary key, of "Customer ID." Table 2 is titled with, and has a primary key, of "Customer Address" with a foreign key of "Customer ID." Table 10 is titled with, and has a primary key, of "Overdue Charges" with a foreign key of "Customer ID." Field 3 stores a customer ID of "Customer X."

Using some of the operations of the method 200, the system generates a source graph 408 in which the data entities 404 are represented as nodes in the graph 408. Each of the nodes is associated with context data as described above. As shown, the context data identifies first, nearest neighbors, and the nature of the relationship (e.g., child or peer). In the illustrated scenario, only the nodes associated with Table 1 and Table 10 are illustrated with context data although it will be appreciated that each of the nodes is associated with context data.

The mapping is schematically illustrated is scenario 412. As shown by a dashed line, Table 1 in source graph 408 is analogous to Table 28 in the target graph 416 as determined by the operation of the method 200. Table 10 in source graph 408 is analogous to Table 26 in the target graph 416. This mapping may be stored in a data structure.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. In some examples a graphics processing unit (GPU) may be adapted to perform the methods described above. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   generating a first graph representing a source database schema comprising a first set of entities, wherein a first set of nodes in the first graph respectively represent entities in the first set of entities, and wherein a first set of edges in the first graph respectively represent relationships between entities in the first set of entities;
   generating a first graphical context data, for a first node in the first set of nodes, representing relationships of the first node to other nodes in the first set of nodes, the first node representing a first entity in the first set of entities;
   identifying a second graph representing a target database schema comprising a second set of entities, wherein a second set of nodes in the second graph respectively represent entities in the second set of entities, and wherein a second set of edges in the second graph respectively represent relationships between entities in the second set of entities;
   generating a second graphical context data, for a second node in the second set of nodes, representing relationships of the second node to other nodes in the second set of nodes, the second node representing a second entity in the second set of entities;
   selecting the first node in the first set of nodes and the second node in the second set of nodes for comparison based on a similarity value between a first set of first attribute data associated with the first entity and a second set of second attribute data associated with the second entity;
   comparing the first graphical context data, for the first node, to the second graphical context data for the second node to determine that (a) the first entity in the first set of entities corresponds to (b) the second entity in the second set of entities;
   responsive to determining that (a) the first entity in the first set of entities corresponds to (b) the second entity in the second set of entities, generating a mapping that converts an association of a target data item from the first entity to the second entity;
   storing the mapping such that the mapping is accessible for converting source data entities into target data entities.

2. The media of claim 1, wherein the similarity value for selecting the first node for comparison to the second node is above a threshold value.

3. The media of claim 1, further comprising selecting the first node in the first set of nodes and the second node in the second set of nodes for comparison based on an identification, by a trained graph neural network machine learning model, of the first node as similar to the second node, wherein the identification is based on the first graphical context data being similar to the second graphical context data.

4. The media of claim 1, further comprising selecting the first node in the first set of nodes and the second node in the second set of nodes for comparison at least by:
   selecting a first subset of nodes in the first set of nodes to compare to a second subset of nodes the second set of nodes; and
   identifying the first node within the first subset of nodes as having a similarity level with the second node within the second subset of nodes that is above a threshold value.

5. The media of claim 1, wherein comparing the first graphical context data to the second graphical context data comprises:
   analyzing the first graphical context data for the first node using a trained graph neural network machine learning model;
   analyzing the second graphical context data for the second node using the trained graph neural network machine learning model;
   identifying a similarity level based on a degree of similarity between the first graphical context data and the second graphical context data; and
   responsive to determining that the similarity level is above a threshold value, determining that the first entity represented by the first node is similar to the second entity represented by the second node.

6. The media of claim 5, wherein generating the second graphical context for the second node further comprises:
   generating a predicted second graphical context that includes a predicted second set of edges and a predicted second set of nodes, the generating based at least on attributes of the second node and the second set of edges; and
   comparing the predicted second graphical context to the second graphical context; and
   adding to the second graphical context one or both of a subset of edges in the predicted second set of edges that are absent in the second set of edges and a subset of nodes in the predicted second set of nodes absent in the second set of nodes, the adding producing an updated second graphical context.

7. The media of claim 1, further comprising:
   receiving user input revising the generated mapping to convert the association of the target data item from the first entity to a third entity different from the second entity; and
   using the revised mapped to update a training dataset for a trained machine learning model that is trained to generate the mapping.

8. The media of claim 1, further comprising training a graphical neural network machine learning model to analyze the source database schema and the target database schema and the corresponding first graphical context data and second graphical context data to generate a mapping that converts an associated of a target data item from the first entity to the second entity.

9. A computer-implemented method comprising:
   generating a first graph representing a source database schema comprising a first set of entities, wherein a first set of nodes in the first graph respectively represent entities in the first set of entities, and wherein a first set of edges in the first graph respectively represent relationships between entities in the first set of entities;

generating a first graphical context data, for a first node in the first set of nodes, representing relationships of the first node to other nodes in the first set of nodes, the first node representing a first entity in the first set of entities;

identifying a second graph representing a target database schema comprising a second set of entities, wherein a second set of nodes in the second graph respectively represent entities in the second set of entities, and wherein a second set of edges in the second graph respectively represent relationships between entities in the second set of entities;

generating a second graphical context data, for a second node in the second set of nodes, representing relationships of the second node to other nodes in the second set of nodes, the second node representing a second entity in the second set of entities;

selecting the first node in the first set of nodes and the second node in the second set of nodes for comparison based on a similarity value between a first set of first attribute data associated with the first entity and a second set of second attribute data associated with the second entity;

comparing the first graphical context data, for the first node, to the second graphical context data for the second node to determine that (a) the first entity in the first set of entities corresponds to (b) the second entity in the second set of entities;

responsive to determining that (a) the first entity in the first set of entities corresponds to (b) the second entity in the second set of entities, generating a mapping that converts an association of a target data item from the first entity to the second entity;

storing the mapping such that the mapping is accessible for converting source data entities into target data entities.

10. The method of claim 9, wherein the similarity value for selecting the first node for comparison to the second node is above a threshold value.

11. The method of claim 9, further comprising selecting the first node in the first set of nodes and the second node in the second set of nodes for comparison based on an identification, by a trained graph neural network machine learning model, of the first node as similar to the second node, wherein the identification is based on the first graphical context data being similar to the second graphical context data.

12. The method of claim 9, further comprising selecting the first node in the first set of nodes and the second node in the second set of nodes for comparison at least by:
selecting a first subset of nodes in the first set of nodes to compare to a second subset of nodes the second set of nodes; and
identifying the first node within the first subset of nodes as having a similarity level with the second node within the second subset of nodes that is above a threshold value.

13. The method of claim 9, wherein comparing the first graphical context data to the second graphical context data comprises:
analyzing the first graphical context data for the first node using a trained graph neural network machine learning model;
analyzing the second graphical context data for the second node using the trained graph neural network machine learning model;

identifying a similarity level based on a degree of similarity between the first graphical context data and the second graphical context data; and responsive to determining that the similarity level is above a threshold value, determining that the first entity represented by the first node is similar to the second entity represented by the second node.

14. The method of claim 13, wherein generating the second graphical context for the second node further comprises:
generating a predicted second graphical context that includes a predicted second set of edges and a predicted second set of nodes, the generating based at least on attributes of the second node and the second set of edges; and
comparing the predicted second graphical context to the second graphical context; and
adding to the second graphical context one or both of a subset of edges in the predicted second set of edges that are absent in the second set of edges and a subset of nodes in the predicted second set of nodes absent in the second set of nodes, the adding producing an updated second graphical context.

15. A system comprising:
at least one device including a hardware processor;
the system being configured to perform operations comprising:
generating a first graph representing a source database schema comprising a first set of entities, wherein a first set of nodes in the first graph respectively represent entities in the first set of entities, and wherein a first set of edges in the first graph respectively represent relationships between entities in the first set of entities;

generating a first graphical context data, for a first node in the first set of nodes, representing relationships of the first node to other nodes in the first set of nodes, the first node representing a first entity in the first set of entities;

identifying a second graph representing a target database schema comprising a second set of entities, wherein a second set of nodes in the second graph respectively represent entities in the second set of entities, and wherein a second set of edges in the second graph respectively represent relationships between entities in the second set of entities;

generating a second graphical context data, for a second node in the second set of nodes, representing relationships of the second node to other nodes in the second set of nodes, the second node representing a second entity in the second set of entities;

selecting the first node in the first set of nodes and the second node in the second set of nodes for comparison based on a similarity value between a first set of first attribute data associated with the first entity and a second set of second attribute data associated with the second entity;

comparing the first graphical context data, for the first node, to the second graphical context data for the second node to determine that (a) the first entity in the first set of entities corresponds to (b) the second entity in the second set of entities;

responsive to determining that (a) the first entity in the first set of entities corresponds to (b) the second entity in the second set of entities, generating a mapping that converts an association of a target data item from the first entity to the second entity;

storing the mapping such that the mapping is accessible for converting source data entities into target data entities.

16. The system of claim 15, wherein the similarity value for selecting the first node for comparison to the second node is above a threshold value.

17. The system of claim 15, further comprising selecting the first node in the first set of nodes and the second node in the second set of nodes for comparison based on an identification, by a trained graph neural network machine learning model, of the first node as similar to the second node, wherein the identification is based on the first graphical context data being similar to the second graphical context data.

18. The system of claim 15, further comprising selecting the first node in the first set of nodes and the second node in the second set of nodes for comparison at least by:
- selecting a first subset of nodes in the first set of nodes to compare to a second subset of nodes the second set of nodes; and
- identifying the first node within the first subset of nodes as having a similarity level with the second node within the second subset of nodes that is above a threshold value.

* * * * *